Sept. 8, 1964   F. A. PACHMAYR ETAL   3,147,562
REINFORCED RECOIL PAD FOR SHOULDER FIREARMS
Filed June 25, 1962   2 Sheets-Sheet 1
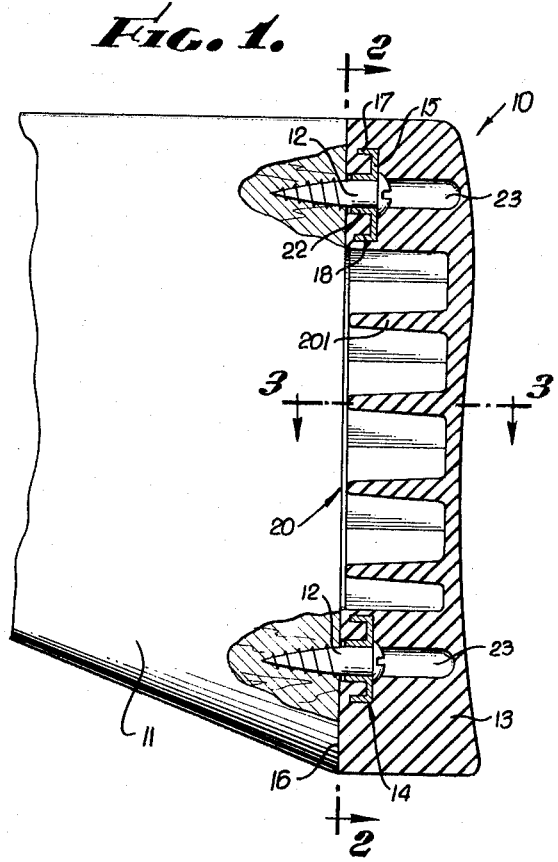
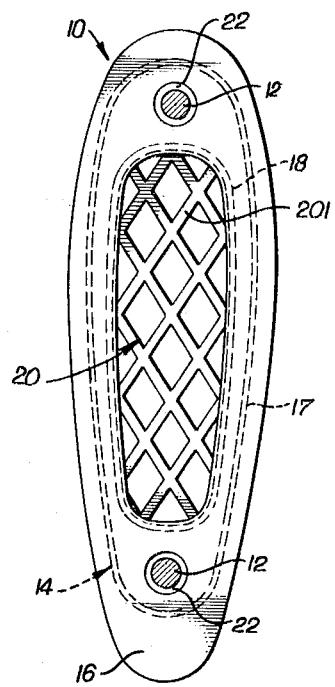
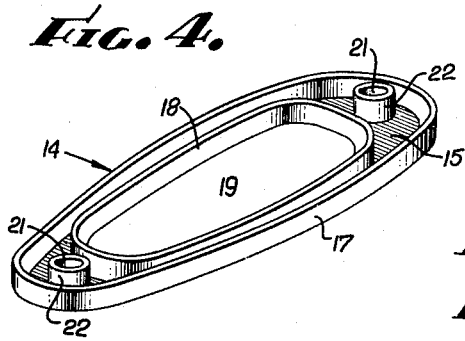
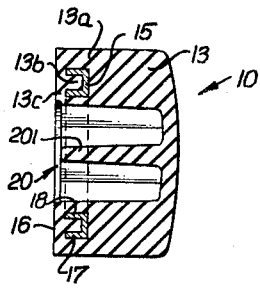
FRANK A. PACHMAYR
LLOYD L. HUSKEY
EDWARD B. MILLER
INVENTORS.
BY White and Haefliger
ATTORNEYS.

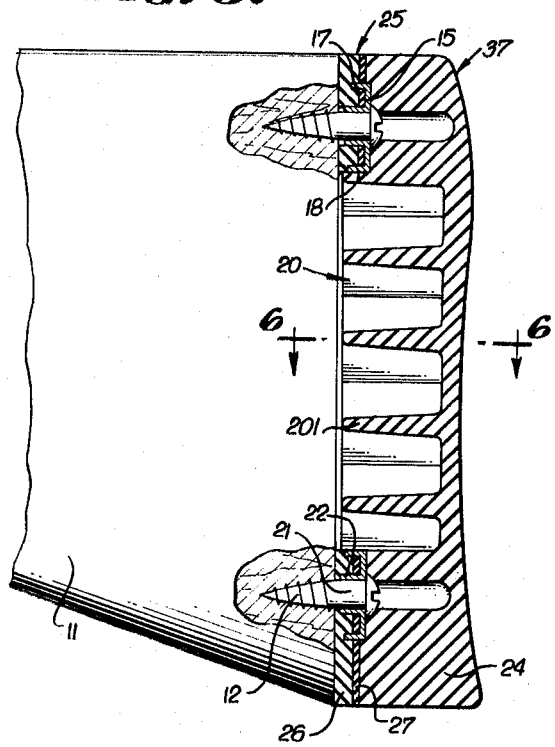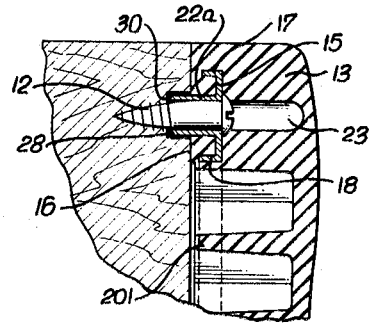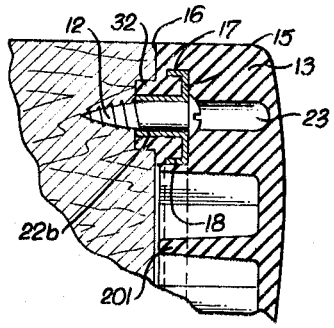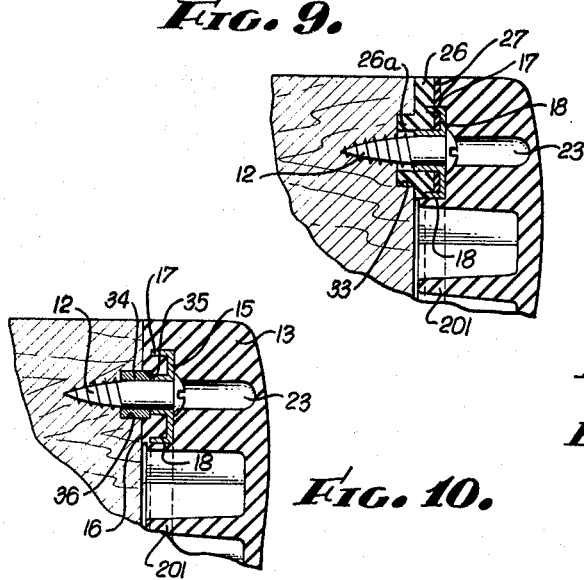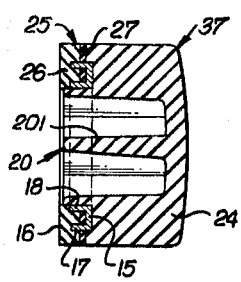
Frank A. Pachmayr
Lloyd L. Huskey
Edward B. Miller
INVENTORS.
BY White and Haefliger
ATTORNEYS.

United States Patent Office 3,147,562
Patented Sept. 8, 1964

3,147,562
REINFORCED RECOIL PAD FOR SHOULDER
FIREARMS
Frank A. Pachmayr and Edward B. Miller, Culver City, and Lloyd L. Huskey, Alhambra, Calif., assignors to Pachmayr Gun Works, Inc., Los Angeles, Calif., a corporation of California
Filed June 25, 1962, Ser. No. 204,816
10 Claims. (Cl. 42—74)

This invention relates to improvements in recoil pads for shoulder firearms, in which the pad structure includes generally a cushion body made entirely or partially of rubber and which is internally strengthened by metallic reinforcement apertured to pass screws for attachment of the pad to the end face of a gun stock.

The invention has for its primary object to provide an improved form of metallic reinforcement applicable particularly to configurations where the pad body is internally recessed at its stock-engaging face, and contains cushioning apertures communicating with the recessed area. By reason of the novel form of the present internal reinforcement and its bonded relation to the body of the pad, we serve its important purposes in assuring greater rigidity, strength and more uniform force distribution in the reinforcement itself, and also stronger bonded control of the rubber body against distortion, separation from the gun stock in applied condition, and integration of laminated components of the body where the pad may be of the later described laminated construction.

Structurally, the invention contemplates embedding within the rubber pad body an elongated metallic plate having an open center area peripherally defined by a substantially continuous inwardly projecting flange, the outer periphery of the plate being defined by a second inwardly projecting and substantially continuous flange, so that in cross section, the plate presents a channel-shaped configuration having characteristic channel rigidity and presenting both inside and outside flanges for bondage to the body and maintenance thereof in proper condition over prolonged usage and repeated subjections to recoil stresses. The present reinforcement plate presents a further feature and advantage in providing about its screw-passing apertures, annular portions projecting in sufficient proximity to the inner face of the pad that upon tightening of the attachment screws, such projections may be brought substantially into stabilizing engagement with the end face of the stock. As will appear, either or both the plate flanges may be so dimensioned as to approach the stock face in the applied condition of the pad, as to promote strength and rigidity in the mounting.

A further object of the invention is to provide for assured centering of screw-passing openings in the pad, with respect to predetermined locations in the gun stock face, to be entered by the screws, or where screw-receiving openings previously have been formed. For this purpose the invention contemplates association of the pad and countersinks in the stock face about the screw penetrating locations, of centering means which may be formed integrally with the pad, or as separate elements, as according to the embodiments later described.

All the various features and objects of the invention, as well as the details of certain illustrative embodiments, will be more fully understood from the following detailed description of the accompanying drawings in which:

FIG. 1 is a view showing in longitudinal section, one pad embodiment of the invention applied to a gun stock;
FIG. 2 is a view taken on line 2—2 of FIG. 1 showing the inner face of the pad;
FIG. 3 is a cross section of the pad taken on line 3—3 of FIG. 1;
FIG. 4 is a perspective view of the reinforcement plate;
FIG. 5 is a view similar to FIG. 1 illustrating a variational embodiment of the invention;
FIG. 6 is a cross section on line 6—6 of FIG. 5;
FIG. 7 is a fragmentary section showing a further variational feature of the invention; and
FIGS. 8, 9 and 10 are views similar to FIG. 7 illustrating additional variations.

Referring first to FIGS. 1 and 2, the shoulder pad structure generally indicated at 10 is shown to be attached to the end face 11 of a gun stock by screws 12, the rubber body 13 of the pad being elongated and peripherally shaped in accordance with the stock surface to which it is applied.

The pad body 13 contains a metallic reinforcement plate generally indicated at 14, best illustrated in FIGS. 2 and 4 to have lesser length and width than the body, but to be shaped peripherally, generally in accordance therewith. The plate is shown to have an essentially planar base portion 15 from which projects toward the inner face 16 of the pad, an outer flange 17 and a spaced inner flange 18 so that in cross section, see FIG. 3, the plate has the shape characteristics of an endless channel imparting strength and rigidity to the plate which therefore may be made of thin and light weight metal rendered resistant to deformation under stresses to which the pad is subjected both in its application to the gun stock, and in resisting recoil forces.

The pad rubber body 13 is so molded and bonded to the plate 15, including its flanges 17 and 18, that the plate in effect controls the rubber in holding it against distortion from its initially molded condition and shape, and further in assuring maintenance of permanently assured conformance of the body to the end face of the gun stock 11. In this respect, it will be noted that the flanges 17 and 18 project inwardly, sufficiently from the base area 15, to afford continuous and extending contact to the rubber bonded to them, thus holding in place the rubber outside the plate at 13a, as well as the rubber at 13b between the flanges, and at 13c at the inner face of the pad. If desired, either or both of the flanges 17 and 18 may be brought sufficiently close to the inner pad face 16 as to approach contact with the end face of the gun stock in the applied condition of the pad.

The plate flange 18 extends about an open interior area 19 which defines a generally corresponding central recessed area 20 of the pad in open exposure to cushioning recesses or voids 20 which may be molded into the rubber in any desired pattern capable of producing a cushioning effect, upon recoil compression of the pad, over the recessed area. Typically, the voids and the webs 201 defining them, are shown to have diamond shaped configurations. It will be noted that the webs 201 have tapering enlargements to their junctures with the outer body of the pad, thus to have progressively increasing resistance to compression under recoil forces.

The base portion 15 of the reinforcement plate contains screw passing apertures 21 within inwardly projecting or boss portions 22 of the plate located between the end portions of the flanges 17 and 18. These projections 22 preferably have sufficient extent toward the inner face 16 of the pad, that in the applied condition of the pad, the projections are brought by the tightening of screws 12 into close proximity to, or virtual contact with the end face of the stock, thus to rigidize the pad mounting thereto and provide for stable distribution of forces between the reinforcement and the rubber body. The latter may be made of rubber sufficiently soft to permit insertion of the screws through the rubber at the outside of the recesses 23, so that the rubber in effect will have closed after insertion of the screws and will be sufficiently displaceable as to enable the screw heads to engage against the surface of the plate base 15.

FIGS. 5 and 6 illustrate a variational embodiment of the invention which is generally similar to the described form, except that here the pad body is of laminated construction, and the reinforcement plate serves the added function of interlocking and holding the laminations in their original proper relation under all service conditions. Being essentially the same as the described reinforcement plate 14, the plate parts shown in FIGS. 5 and 6 are given corresponding reference numerals. Otherwise the variational form differs in that the body 23 comprises a main rubber portion 24 bonded to an inner lamination generally indicated at 25, comprising a hard rubber or equivalent non-metallic layer 26 bonded to a somewhat thinner and softer layer 27, made for example of a rubber which may be softer than base layer 26, but harder than the rubber 24 to which it is bonded. Here the inner flange 18 of the reinforcement plate 14 is shown to project within the pad recess area 20 at the inside of the laminations 26 and 27, and the outer flange 17 extends through the lamination 27 and into the harder rubber layer 26, thus to lock together and reinforce the interlaminate bond against separation of the layers. Similarly, the tubular projections 22 about the screw apertures 21 extend through the intermediate lamination 27 into the base layer 26 to further strengthen the bond between the layers and protect them against any adverse bearing effects of the tightened screws.

In the manufacture of the pad shown in FIG. 5, the layers 26 and 27, with or without previous bondage together, may be placed in a suitable mold together with the reinforcement place 14 so that its projections 22 register with preformed openings 28 in the laminations. The mold structure is such as to receive the rubber to form the body 24, and the assembly is subjected to sufficient heat and pressure to bring the parts into the condition substantially as shown by FIG. 5 in which the body 24 is bonded to the reinforcement plate and lamination 27, and the latter together with the base layer 26 become bonded to the base end flanges 17 and 18 of the reinforcement plate.

FIGS. 7 to 10 illustrate further variational features of the invention which are concerned with maintaining accurately centered relation between screw-passing openings in the pad, and screw-receiving centers in the end face of the gun stock.

Referring first to FIG. 7, the reinforcement plate projections 22a, corresponding to the previously described projections 22, may be extended beyond the pad face 16 to be received within recesses 30 drilled into the end face of the stock at locations in centered relation to the screws 12. Reception of the reinforcement plate projections 28 within and in fitted relation with the recesses 30, thus assures accurate alignment of the pad with the stock and accurately centered relation with the locations at which the screws initially are to be turned into the stock, or subsequently may be screwed into previously formed openings therein.

According to the showing in FIG. 8, the aligning pad projection is in the form of a rubber boss 32 molded integrally with the body 13 and internally supported, if desired, by extension 22b of the plate boss internally corresponding to the screw diameter, as in the case of boss 22a in FIG. 7.

FIG. 9 illustrates the centering feature with respect to a laminated pad structure like that described with reference to FIG. 5. Here the inner hard rubber layer 26 is shown to have an integrally molded centering boss 26a received within the screw recess 33.

According to the further variation appearing in FIG. 10, the centered relation is effected by a separately formed insert of metal or hard rubber, in the form of a tubular sleeve 34, one end of which is received within the pad recess 35 and the opposite extent within stock recess 36.

We claim:

1. A recoil pad applicable to the end face of a gun stock, comprising a body including cushion rubber peripherally shaped in accordance with said face, said body having an inner face engageable against said stock face, and an elongated metallic plate embedded in and bonded to the body rubber and spaced peripherally from the body periphery, said plate having spaced apart outer and inner substantially continuous flanges projecting toward said inner face of the body, said inner flange extending about an elongated open center area of the plate exposed to a plurality of cushioning recesses in the body rubber, and screw apertures within end portions of the plate between said flanges.

2. A pad according to claim 1, in which said cushioning recesses extend inwardly of the body from an inner face thereof surrounded by said inner flange and lying in substantially the plane of the plate portion between said flanges.

3. A recoil pad according to claim 1, in which at least one of said flanges projects in close proximity to said inner face of the body.

4. A recoil pad according to claim 1, in which said apertures are surrounded by annular portions of the plate projecting in the direction of said flanges.

5. A recoil pad according to claim 1, in which said cushioning recesses are defined between intersecting webs tapered inwardly toward the plane of said inner face of the body.

6. A recoil pad according to claim 4, in which said annular portions are embedded in the body rubber and project sufficiently close to said inner face of the body to be substantially engageable with said stock face upon tightening of screws inserted through said apertures into the gun stock.

7. A recoil pad according to claim 1, in which said body comprises a pair of non-metallic laminations at the inner face of the body and one of which is bonded to the rubber thereof, said laminations extending about said open center area of the plate.

8. A recoil pad according to claim 7, in which said inner flange projects into said one of the laminations.

9. A recoil pad according to claim 7, in which said outer flange extends through said one of the laminations into the other lamination.

10. A recoil pad according to claim 7, in which said screw apertures are surrounded by annular portions of the plate projecting through said one of the laminations into the other lamination.

References Cited in the file of this patent

UNITED STATES PATENTS

| | | |
|---|---|---|
| 150,717 | Scott | May 12, 1874 |
| 1,128,037 | Perkins | Feb. 9, 1915 |
| 1,842,528 | Knight | Jan. 26, 1932 |
| 1,951,135 | Emswiler | Mar. 13, 1934 |
| 2,667,005 | Weis | Jan. 26, 1954 |
| 2,787,855 | Guymon | Apr. 9, 1957 |
| 2,925,679 | Bivens | Feb. 23, 1960 |
| 3,007,272 | Pachmayr | Nov. 7, 1961 |